US005264524A

United States Patent [19]

Harris

[11] Patent Number: 5,264,524

[45] Date of Patent: Nov. 23, 1993

[54] GAS-IMPERMEABLE POLYUREA POLYMER SYSTEMS

[75] Inventor: Frank W. Harris, Akron, Ohio

[73] Assignee: Edison Polymer Innovation Corporation, Brecksville, Ohio

[21] Appl. No.: 837,006

[22] Filed: Feb. 14, 1992

[51] Int. Cl.[5] .............................................. C08F 8/30

[52] U.S. Cl. .................................. 525/128; 525/127; 525/238; 528/64

[58] Field of Search ........................ 525/128, 127, 238

[56] References Cited

U.S. PATENT DOCUMENTS

| | | | |
|---|---|---|---|
| 4,331,786 | 5/1982 | Foy et al. | 525/408 |
| 4,618,706 | 10/1982 | Scholl et al. | 560/335 |
| 4,663,483 | 5/1987 | Hergenrother et al. | 564/396 |
| 5,019,608 | 5/1991 | Shah | 523/467 |
| 5,059,666 | 10/1991 | Harris | 526/285 |

*Primary Examiner*—James J. Seidleck
*Assistant Examiner*—Mary Critharis
*Attorney, Agent, or Firm*—Hudak & Shunk Co.

[57] ABSTRACT

Block copolymers possessing good gas impermeability, solvent resistance, and physical properties are prepared by forming a prepolymer through the reaction of a diisocyanate compound with a diamine compound, and thereafter reacting the prepolymer with an amine-terminated butadiene-acrylonitrile oligomer.

7 Claims, No Drawings

GAS-IMPERMEABLE POLYUREA POLYMER SYSTEMS

TECHNICAL FIELD

This invention relates to novel block copolymers. More particularly, this invention relates to solvent-resistant, gas-impermeable films and coatings useful in the fabrication of air-tight structures such as pneumatic tires; to novel adhesive systems; and to other novel, elastomeric products. Specifically, this invention relates to block copolymers formed from diisocyanate-secondary diamine prepolymers that have been subsequently reacted with amine-terminated butadiene-acrylonitrile oligomers to produce polymeric products exhibiting both plastic and elastomeric characteristics.

BACKGROUND OF THE INVENTION

Pneumatic tires, including tubeless pneumatic tires, have for many years been used on vehicles, particularly on automobiles and trucks.

Such tires commonly rely on air-impermeable inner liners to retain the air required to give them their necessary torus configuration. In the past, inner liners made from butyl rubber, i.e., a copolymer of isobutylene and isoprene, have been used by the industry in view of the fact that vulcanizates of such rubber have good tensile strength and abrasion resistance, display excellent impermeability to air, and have a service temperature range of from about $-55°$ to about $+204°$ C.

While the above properties are all useful in providing the characteristics necessary for the successful performance of tires, such inner liners have certain inherent drawbacks which it would be of advantage to avoid. Butyl rubber inner liners, for example, must first be formed and thereafter fastened to the surface constituting the inside of a tire's carcass, an operation involving manufacturing and processing procedures entailing considerable cost.

One way in which the processing costs described could be minimized would be to substitute for the butyl rubber liners of the type described, liners comprising air-impermeable coatings utilizing, for example, the bispropynone-based polymer systems systems described in U.S. Pat. No. 5,059,666. However, while some of the polymers there disclosed display excellent air-impermeability and could simply be coated on the tires' interior surfaces, the bisopropynones on which the polymer systems are based are relatively costly materials which would make such coatings undesirably expensive, adding correspondingly excessive costs to the tire's manufacture. In addition, the mechanical properties of the materials there taught are inferior to the physical properties of the materials disclosed herein.

BRIEF DESCRIPTION OF THE INVENTION

In view of the preceding, therefore, it is a first aspect of this invention to provide novel block copolymers possessing desirable plastic and elastomeric properties.

A second aspect of this invention is to provide block copolymers possessing a relatively high degree of gas impermeability, which retain their elastomeric properties over a wide useful working temperature range.

Another aspect of this invention is to provide relatively inexpensive block copolymer systems suitable for forming substantially gas-impermeable films, for adhesive systems and other products.

A further aspect of this invention is to provide block copolymers that are relatively insoluble in ordinary solvents over prolonged periods of time.

An additional aspect of this invention is to produce pneumatic tires and other products where impermeability is of importance, for example, in liquid-impermeable gloves.

Still an additional aspect of this invention is to provide tubeless pneumatic tires whose interiors are coated with relatively inexpensive, substantially air-impermeable inner liners.

Yet another aspect of this invention is to provide block copolymers that can be employed in the construction of pneumatic tires as a replacement for the butyl rubber inner liners now commonly used.

The preceding and additional aspects of this invention are provided by a method for preparing block copolymers comprising preparing a prepolymer by reacting a diisocyanate compound having the general formula:

$$OCN{-}R{-}NCO,$$

where R may be alkylene, cycloalkylene, arylene or mixtures of them, and a secondary diamine compound having the general formula:

$$R_2NH{-}R_1{-}NHR_2,$$

where $R_1$ may be alkylene, cycloalkylene, arylene or mixtures of them, and $R_2$ is alkyl, and may be the same or different, and thereafter reacting said prepolymer with an amine-terminated butadiene-acrylonitrile oligomer to produce a desired block copolymer product.

The preceding and other aspects of this invention are provided by a method for preparing thermoplastic-elastomeric block copolymers comprising forming a prepolymer by reacting a diisocyanate compound having the general formula:

$$OCN{-}R{-}NCO,$$

where R may be alkylene, cycloalkylene, arylene or mixtures of them, with a secondary diamine compound having the general formula:

$$R_2NH{-}R_1{-}NHR_2,$$

where $R_1$ may be alkylene, cycloalkylene, arylene or mixtures of them, and $R_2$ is alkyl, and may be the same or different, and thereafter reacting said first prepolymer with an amine-terminated butadiene-acrylonitrile oligomer having the general formula:

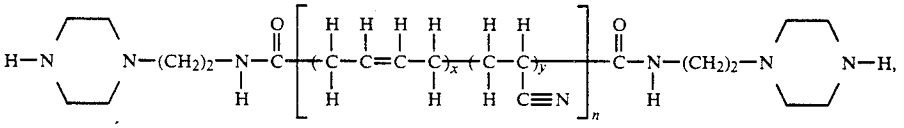

thereby producing a desired copolymer product.

The preceding and further aspects of this invention are provided by a pneumatic tire having an inner comprising a layer of a block copolymer formed by the method of the penultimate paragaph.

DETAILED DESCRIPTION OF THE INVENTION

The method of the invention comprehends the preparation of an isocyanate prepolymer formed by mixing and reacting appropriate relative amounts of a diisocyanate compound, with a secondary diamine compound, either neat, or in a solvent medium. Thereafter in a second step, the isocyanate prepolymer is similarly reacted with a suitable amount of an amine-terminated butadiene-acrylonitrile oligomer until the desired block copolymer, sometimes referred to herein as a "solvoplatic elastomer", SPE, since it can be solution-processed, has been formed. The reaction described requires no catalyst, and it can be carried out at moderate temperatures, for example at about room temperature. The resulting block copolymer can thereafter be directly solution cast into thin films, molded neat into desired shapes, used as an adhesive system, or otherwise fabricated into products, as desired. Alternately, the copolymer can also be emulsified in aqueous solution and processed in that form. A significant advantage of the block copolymers of the invention is that while they can be solution processed, once isolated from the processing solvent, they become substantially insoluble and thereafter resist resolution.

The reactions involved in the method may be exemplified in the following representative reaction sequence:

employed, including those of the alkyl, cycloalkyl or aromatic types.

Typical diisocyanates include for example 2,4 and 2,6-toluene diisocyanate, including mixtures thereof, TDI; hexamethylene diisocyanate, HDI; 4,4'-methylenediphenyldiisocyanate, MDI; 4,4'methylene bis-cyclohexyl diisocyanate, $H_{12}MDI$; 1,5-naphthalene diisocyanate, isophorone dissocyanate, an others.

Diamine compounds useful for preparing the diisocyanate prepolymers include hindered secondary diamines of the general formula:

$$R_2NH—R_1—NHR_2$$

where $R^1$ is alkyl, cycloalkyl, aryl or mixtures of them, and which may also contain ether, amide, or thiol linkages, and $R^2$ is alkyl, and may be the same or different.

While any of a wide variety of secondary diamine compounds are useful for purposes of the invention, typical examples of suitable compounds include those manufactured by Universal Oil Product Company, for example, Unilink 4100, Unilink 4200 and Unilink 8100:

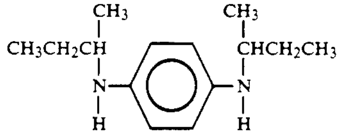
Unilink 4100

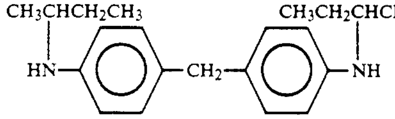
Unilink 4200

Step 1

$2O=C=N—(CH_2)_6—N=C=O$ +

Hexamethylene diisocyanate (HDI)

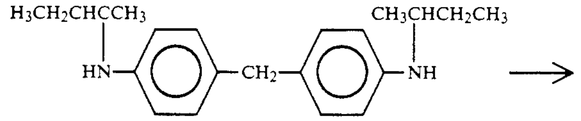
Diamine

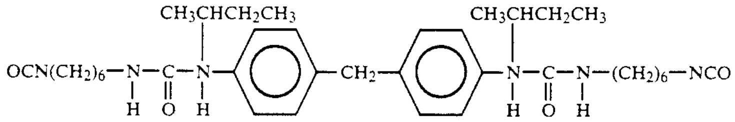
Isocyanate Prepolymer (IP)

Step 2

Isocyanate Prepolymer +

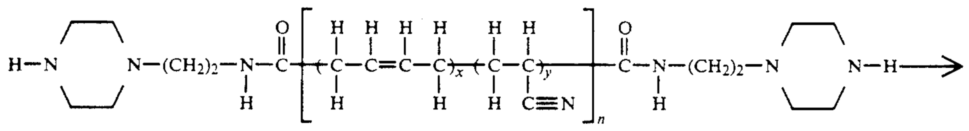
Amine-terminated Butadiene Acrylonitrile Oligomer

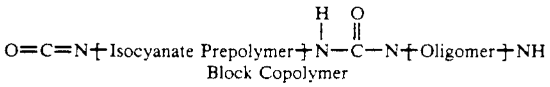
Block Copolymer

In preparing the isocyanate prepolymers of the invention, any of a variety of diisocyanate compounds may be -continued

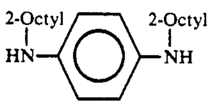

Unilink 8100

The amine-terminated butadiene-acrylonitrile oligomer, ATBN, of the invention comprises compounds of the formula:

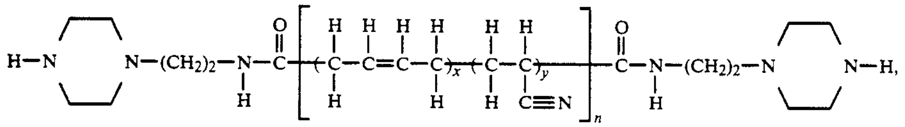

where n is a whole number, x=1 and y=0 to 0.5.

In synthesizing the isocyanate prepolymers, the diisocyanate compound and the secondary diamine compound will typically be mixed in a ratio of about two equivalent weights of the diisocyanate compound for each equivalent weight of the secondary diamine compound employed, while in preparing the final block copolymer it is usually desirable to mix about equal equivalent weights of the diisocyanate prepolymer and the amine-terminated butadiene-acrylonitrile oligomer. Different ratios of such reactants may be employed, however, and in the case of synthesizing the isocyanate prepolymer, the hard block portion of the block copolymer, changing the character of the diisocyanate employed can be resorted to in order to suitably alter the final product's physical properties, for example, its modulus and tensile strengths.

The amine-terminated butadiene-acrylonitrile oligomers of the invention are prepared from acrylonitrile and 1,3 butadiene, and it has been found that the amount of acrylonitrile employed in synthesizing the ATBN, i.e., the weight percent of acrylonitrile present in the butadiene-acrylonitrile reaction mixture, sometimes referred to herein as the percent acrylonitrile in the ATBN, has an important influence on properties of the final solvoplastic elastomeric products such as, for instance, their gas permeability. For example, it has been determined that as the percent acrylonitrile is reduced, the block copolymer products begins to display less desirable gas-impermeability characteristics. When the percent acrylonitrile rises, on the other hand, the glass transition temperature, $T_g$, begins to rise, and the block copolymers become correspondingly less flexible at lower temperatures. Thus in the case of applications in which the block copolymers are to be employed as inner liners for tires, for example, it is desirable to maintain the percent acrylonitrile in the range from about 10%-30% to assure satisfactory flexing in cold weather. Examples of commercial products within this range include those sold by the B. F. Goodrich Company under the name HYCAR 1300 X21, and HYCAR 1300 X16, such compounds representing 10% and 16% acrylonitrile, respectively.

Although not essential in synthesizing the isocyanate prepolymer, the use of a solvent confers certain advantages, for example, the isocyanate prepolymer obtained typically displays more structural uniformity if a solvent is used in its preparation. Consequently, in one embodiment of the invention, both the isocyanate prepolymer and the final block copolymer product are prepared in the presence of a solvent. However, the reactions may also be carried out neat.

Suitable solvents can include, for instance, dicholoroethane, methyl chloride, ethyl acetate, 2-ethoxyethyl acetate and others of the types familiar to those skilled in the art.

In carrying out the reaction resulting in the formation of the isocyanate prepolymer in a solvent, the two reactants, i.e., the diisocyanate compound and the secondary diamine compound are combined with the solvent at room temperature, e.g., about 25° C.; however, the reaction temperature can range from about 0° to about 145° C.

The period required to form the isocyanate prepolymer will often vary from about 15 minutes to about 4 hours, approximately 1 hour being typical. The isocyanate prepolymers resulting from the reaction can have molecular weights of from about 300 to 1300, or higher. The reaction resulting in formation of the block copolymer, solvoplastic elastomeric product, usually takes from about 1 hour to about 36 hours, approximately 20 hours often being typical. In regard to the length of the latter reaction period, it is ordinarily desirable to allow the reaction to proceed to the point where a maximum reaction solution viscosity, i.e., a maximum polymer molecular weight, has been achieved, without, however, creating the formation of a gelled product. Once the block copolymer has been formed, it is of advantage to subject the reaction mixture to whatever processing steps are required to produce the desired product before the block copolymer begins to appreciably precipitate from solution, which sometimes occurs and can impair the product's usefulness in certain applications.

The intrinsic viscosity of the block copolymers, as measured in chloroform at 30° C., will frequently be in the range of up to about 0.95 to about 1.1 dL/g. As previously indicated, it is desirable to continue the reaction resulting in the formation of block copolymer final product as long as an increase in molecular weight of the copolymer is being experienced.

At the conclusion of the reaction, the block copolymer solution can be cast into a film and air dried, or otherwise processed in ways well known in the art. The films thus produced display excellent elastomeric properties. A unique aspect of the invention resides in the fact that although the block copolymers can be solution processed, once isolated from the processing solvent, they become insoluble and thereafter resist resolution.

While not wishing to be bound by the theory, it appears that as the block copolymers form into solid films during the drying process, the hard block isocyanate-diamine prepolymer segments and the soft block ATBN segments agglomerate into substantially separate domains, thereby providing products that have both plastic and elastomeric characteristics. In this regard, hard-block domains have been detected with small angle X-ray scattering having a diameter of about 100 Å.

As indicated, materials of the invention display excellent gas-impermeability characteristics as may be seen from the following TABLE 1, which compares the air permeability of butyl rubber with that of a block copolymer of the invention. The TABLE confirms that a film of a block copolymer of the invention yields little additional air permeability compared to butyl rubber.

TABLE 1

| POLYMER | FILM THICKNESS, MILS | PERMEABILITY $FT^3$/MIL/PSI/DAY |
|---|---|---|
| Butyl rubber | 25-30 | 3.23 |
| HDI/Unilink-4200/HYCAR (Acrylo. - 26%) | 10-15 | 4.45 |

As indicated in the preceding, the block copolymers of the invention also exhibit excellent resistance to the more common solvents as is shown by the following TABLE 2.

TABLE 2

SOLVENT RESISTANCE OF SUBSTITUTED POLY(UREA) (HDI/UNILINK-4200/HYCAR (ACRYLO. = 26%))

| Solvent | Volume ml | Polymer g | Week 1 | 3 | 5 | 7 | 9 | 11 | 13 | 15 |
|---|---|---|---|---|---|---|---|---|---|---|
| chloroform | 10 | .041 | — | — | — | — | — | — | — | — |
| m-Cresol | 10 | .046 | — | — | — | — | S | S | S | S |
| hexanes | 10 | .047 | — | — | — | — | — | — | — | — |
| DMF | 10 | .043 | — | — | — | — | — | — | — | — |
| tolulene | 10 | .050 | — | — | — | — | — | — | — | — |
| $CH_2Cl_2$ | 10 | .046 | — | — | — | — | — | — | — | — |
| NMP | 10 | .048 | — | — | — | — | — | — | — | — |
| DMAC | 10 | .050 | — | — | — | — | — | — | — | — |
| 18 M $H_2SO_4$ | 10 | .045 | — | — | — | — | — | — | — | — |
| water | 10 | .040 | — | — | — | — | — | — | — | — |
| triethylamine | 10 | .041 | — | — | — | — | — | — | — | — |
| THF | 10 | .044 | — | — | — | — | — | — | — | — |
| methanol | 10 | .040 | — | — | — | — | — | — | — | — |
| acetonitrile | 10 | .047 | — | — | — | — | — | — | — | — |

S = Swell
D = Dissolve
— = Insoluble

The block copolymers of the invention are also characterized by having excellent elasticity, as well as good tensile strength. Physical properties such as modulii and tensile strengths of the copolymers can be varied by changing the structure of the hard block, as indicated in the foregoing. The following TABLE 3 shows physical properties of some of the block copolymers of the invention.

TABLE 3

SUBSTITUTED POLY(UREA) (HDI/UNILINK-4200/HYCAR)

| Acrylo. % | Modulus (MPa) 100% | 300% | 600% | Maximum Elongation | TS PSI | TEB $MJ/M^3$ | TR kN/M |
|---|---|---|---|---|---|---|---|
| 10 | 1.62 | .83 | .79 | 790 | 1420 | 79.0 | 17.9 |
| 16 | 2.16 | 1.12 | 1.15 | 775 | 2070 | 107 | 55.8 |
| 26 | 2.02 | 1.03 | 0.99 | 760 | 1580 | 82.1 | 24.5 |

TS = tensile strength
TEB = tensile energy to break
TR = tear resistance

In view of the properties described, the block copolymers of the invention lend themselves to a wide variety of uses including the preparation of inner liners for pneumatic tires, fabricated for example by coating surfaces on the interior of the tires with solutions of the block copolymers; the preparation of tank linings, for instance, formed by spraying solvent solutions of the copolymers on the tank's interiors, or by fastening films of the copolymers thereto by ways known to the art; the preparation of relatively gas-impermeable films, which may be used for a variety of purposes; molding processes, for instance, carried out by drying solutions of the block copolymers and then subjecting the resulting solids to heat and pressure, and a wide variety of other applications which will be understood by those skilled in the technology.

While not intended to be limiting in nature, the following examples are illustrative of the invention.

EXAMPLE 1

In one experiment, 1.366 grams of hexamethylene diisocyanate, molecular weight 168.2, 8.121 mmols, is added to a 250 ml, 3-neck, round-bottom flask equipped with a stirring rod, a stirring blade, a stir bearing, and two septums. 10 mls of dichloroethane is added and the mixture stirred rapidly. Thereafter, 1.2611 grams of Unilink 4200 having a molecular weight of 310.49, 4.0616 mmols, is dissolved in 10 mls of dichloroethane. This solution is added dropwise over a period of 5 minutes, and the solution is subsequently allowed to stir for 1 hour.

Thereafter, 10.00 grams, 4.062 mmols, of an amine-terminated butadiene-acrylonitrile oligomer, a B. F. Goodrich HYCAR product containing 26% acrylonitrile, is dissolved in 45 mls of dichloroethane. This solution is added dropwise to the isocyanate-terminated prepolymer over a period of 15 minutes. The polymer is then stirred for 20 hours, and the viscosity determined to be 0.95 dL/g in chloroform at 30° C., as measured by the procedure of ASTM D 2857.

The polymer solution is thereafter cast on a Teflon coated glass and allowed to dry for 24 hours. The block copolymer is subsequently removed from the glass and vacuum dried at 80° C. for 24 hours, thereby producing a copolymer film exhibiting good solvent resistance and impermeability to air.

EXAMPLE 2

In another experiment, 1.7196 g of hexamethylene diisocyanate, 10.224 mmols, is placed in a 200 ml, round-bottom flask equipped with a stirring rod, a stirring blade, and a stir bearing. 10 mls of methylene chloride is added and the mixture stirred rapidly. 1.5873 g of Unilink 4200, 5.112 mmols, dissolved in 10 mls of methylene chloride is added dropwise. The prepolymer is stirred for 15 minutes, and 10.00 g of HYCAR (1300X16), 5.112 mmole, dissolved in 45 mls of methylene chloride are added dropwise. The mixture is allowed to stir for 35 minutes.

1.00 g of (87-89% hydrolyzed) polyvinyl alcohol (mw=124-186,000) is then dissolved in 50 ml of boiling water and the solution is poured into a 400 ml beaker which contains 1.00 g of dodecyl sodium sulfate. A Teflon mixing head is used to rapidly stir the mixture. The solution of the block copolymer in methylene chloride is subsequently poured into water, and after 30 minutes, the dispersion is slowly heated to 70° C. to drive off the methylene chloride. Finally, the white latex is poured onto glass and allowed to dry, thereby forming an impermeable film.

EXAMPLE 3

In a further illustrative experiment, 0.8903 grams of TDI, 5.112 mmols, is added to a 250 ml, 3-neck, round-bottom flask equipped with a stirring rod, a stirring blade, a stir bearing, and two septums. 10 mls of dichloroethane is added and the mixture stirred rapidly. Thereafter, 0.7932 grams of Unilink 4200 having a molecular weight of 310.49, 2.556 mmols, is dissolved in 10 mls of dichloroethane. This solution is added dropwise over a period of 5 minutes, and the solution is subsequently allowed to stir for 1 hour.

Thereafter, 5.000 grams, 2.556 mmols, of an amine-terminated butadiene-acrylonitrile oligomer, a B.F. Goodrich HYCAR product containing 26% acrylonitrile, is dissolved in 45 mls of dichloroethane. This solution is added dropwise to the isocyanate-terminated prepolymer over a period of 15 minutes and then stirred for 120 minutes.

The polymer solution is thereafter cast on a Teflon coated glass and allowed to dry for 24 hours. The block copolymer is subsequently removed from the glass and vacuum dried at 80° C. for 24 hours, thereby producing a copolymer film exhibiting good solvent resistance and impermeability to air.

EXAMPLE 4

In a still further illustrative experiment, 5.363 grams of $H_{12}MDI$, 20.44 mmols, is added to a 250 ml, 3-neck, round-bottom flask equipped with a stirring rod, a stirring blade, a stir bearing, and two septums. 10 mls of dichloroethane is added and the mixture stirred rapidly. Thereafter, 3.1748 grams of Unilink 4200 having a molecular weight of 310.49, 10.224 mmols, is dissolved in 10 mls of dichloroethane. This solution is added dropwise over a period of 5 minutes, and the solution is subsequently allowed to stir for 1 hour.

Thereafter, 20.000 grams, 10.22 mmols, of an amine-terminated butadiene-acrylonitrile oligomer, a B.F. Goodrich HYCAR product containing 26% acrylonitrile, is dissolved in 75 mls of dichloroethane. This solution is added dropwise to the isocyanate-terminated prepolymer over a period of 15 minutes and then stirred for 20 hours.

The polymer solution is thereafter cast on a Teflon coated glass and allowed to dry for 24 hours. The block copolymer is subsequently removed from the glass and vacuum dried at 80° C. for 24 hours, thereby producing a copolymer film exhibiting good solvent resistance and impermeability to air.

While in accordance with the patent statutes, a preferred embodiment and best mode has been presented, the scope of the invention is not limited thereto, but rather is measured by the scope of the attached claims.

What is claimed is:

1. A method for preparing block copolymers comprising preparing a prepolymer by reacting a diisocyanate compound selected from a member of the group consisting of 2,4-toluene diisocyanate; 2,6-toluene diisocyanate; mixtures of the preceding; hexamethylene diisocyanate; 4,4'methylene diisocyanate; 4,4'methylene bis-cyclohexyl diisocyanate; isophorone diisocyanate, and 1,5-naphthalene diisocyanate, and a secondary diamine compound having the general formula:

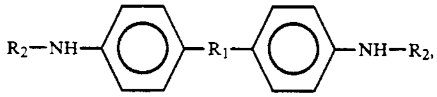

where $R_1$ is alkylene, and $R_2$ is alkyl and may be the same or different, wherein no more than about two equivalent weights of said diisocyanate compound are reacted with each equivalent weight of said secondary diamine compound, said prepolymer being substantially free of excess diisocyanate compound, and thereafter reacting said prepolymer with an amine-terminated butadiene-acrylonitrile oligomer to produce a linear, thermoplastic elastomer block copolymer.

2. A method according to claim 1 wherein said amine-terminated butadiene-acrylonitrile oligomer has the general formula:

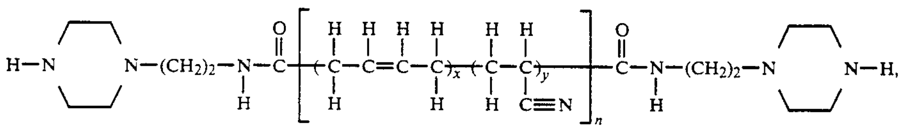

where n is a whole number, x=1 and y=0 to 0.5.

3. A method according to claim 1 wherein said diisocyanate is a compound selected from a member of the group consisting of 2,4-toluene diisocyanate; 2,6-toluene diisocyanate, mixtures of the preceding; and hexamethylene diisocyanate.

4. A method according to claim 1 wherein the amine-terminated butadiene-acrylonitrile oligomer used to form said block copolymer product is prepared from 1,3 butadiene and acrylonitrile reactants in which, on a weight basis, said acrylonitrile comprises from about 10% to about 30% of said reactants.

5. A method according to claim 1 in which said block copolymer has an intrinsic viscosity in chloroform of up to about 0.95 to about 1.1 dL/g.

6. A method according to claim 1 in which the preparation of said prepolymer is carried out in the presence of a solvent for said diisocyanate compound, said secondary diamine compound, and said prepolymer, and the preparation of said block copolymer is carried out in the presence of a solvent for said prepolymer and said amine-terminated butadiene-acrylonitrile oligomer.

7. A block copolymer produced by the method of claim 1.

* * * * *